UNITED STATES PATENT OFFICE.

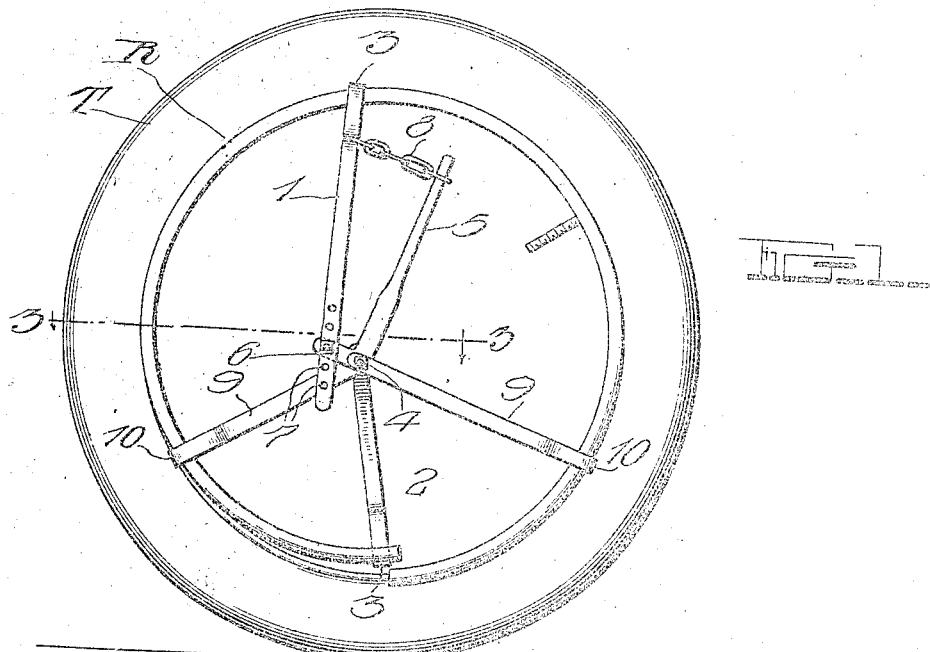
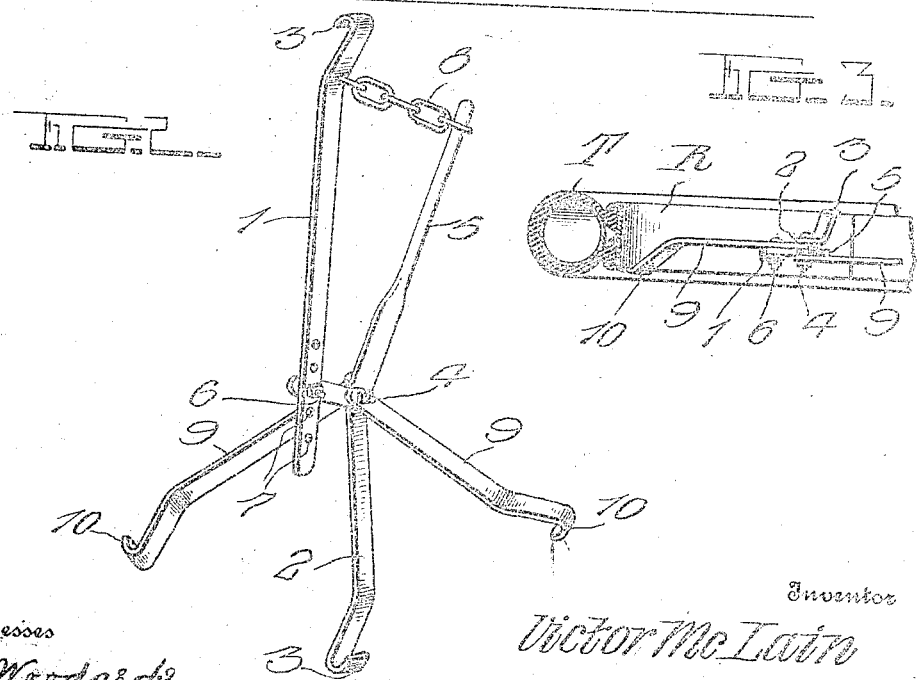

VICTOR McLAIN, OF EAST MOLINE, ILLINOIS.

TOOL FOR CONTRACTING DETACHABLE WHEEL-RIMS.

1,176,230.

Specification of Letters Patent.  Patented Mar. 21, 1916.

Application filed February 18, 1915. Serial No. 9,088.

*To all whom it may concern:*

Be it known that I, VICTOR McLAIN, citizen of the United States, residing at East Moline, in the county of Rock Island and State of Illinois, have invented certain new and useful Improvements in Tools for Contracting Detachable Wheel-Rims; and I do declare the following to be a full, clear, and exact description of the invention, such as will enable others skilled in the art to which it appertains to make and use the same.

My invention relates to improvements in tools for contracting detachable automobile rims, thus allowing the tires thereon to be readily removed.

It is a well known fact that a great number of detachable rims used on automobiles, are of the split ring type, and that it is necessary to move one end of the ring inwardly, thus contracting the entire rim and allowing the tire to be removed.

Since it is practically impossible to so contract the rim by hand, it is the object of my invention to provide a very simple tool for accomplishing this result.

With this object in view, the invention resides in certain novel features of construction and combination hereinafter described and claimed.

In describing the invention, I shall refer to the accompanying drawing, wherein:

Figure 1 is a side elevation of a tool constructed in accordance with my invention, showing its application to use; Fig. 2 is a perspective view of the tool, and Fig. 3 is a horizontal section as seen along the plane indicated by the line 3—3 of Fig. 1.

In this drawing, constituting a part of my invention, R designates the detachable rim of an automobile wheel, this rim being shown of the common split ring type. Surrounding the rim R, and removable therewith, is the usual tire T which must often be removed from the rim after the latter has been detached from the wheel. In order to so remove the tire, it is necessary to contract the rim by moving one of its ends inwardly to the extent shown in Fig. 1, or to a greater extent. For accomplishing this result, a tool constituting the gist of the present invention is provided.

The aforesaid tool is here shown as comprising a plurality of links, two of which, designated by the numerals 1 and 2, are disposed in substantial alinement. The outer ends of these links are provided with hooks 3 adapted to engage the rim, as shown in Figs. 1 and 3, while the inner end of the link 2 is fulcrumed, by the provision of a bolt 4, to the corner of an angular lever 5, the resistance arm of this lever being pivotally connected by a bolt 6 with the inner end of the link 1. The latter is preferably provided with a plurality of openings 7, any one of which may receive the bolt 6, thereby allowing the distance between the two hooks 3 to be varied.

As most clearly disclosed in Figs. 1 and 2, the power arm of the angular lever 5 lies substantially parallel to the link 1 when the tool is in operation upon the rim, in which position it may be retained by inserting it through any one of the links of a chain 8, which is connected to the link 1 near its outer end.

By constructing the tool in the manner above described, it will be evident that when the lever 5 is swung to the right in Fig. 1, the hooks 3 are caused to recede from each other, thereby allowing them to be hooked over the opposite edges of the rim R, whereupon said lever is swung approximately to the position seen in said figure, thus drawing one of the ends of the rim inwardly. To retain the rim in this contracted position, the chain 8 is now employed, as clearly disclosed in Figs. 1 and 2.

Although the invention would operate to great advantage if comprising only the features before described, it is preferably equipped with an additional pair of links 9, whose outer ends are provided with hooks 10, while their inner ends are pivoted upon the bolt 4. As shown in the drawing, the two links 9 are shown as spaced a suitable number of degrees from the links 1 and 2, it being understood, however, that said links 9 are free to be moved to any desired position.

From the foregoing description, taken in connection with the accompanying drawing, it will be evident that although a very simple tool has been provided for carrying out the object of the invention, the same will be very efficient in operation and will possess a number of advantageous features. Although the same has been hereinbefore suggested, it may be well to direct attention to the fact that the hooks 3 are formed by bending the outer ends of the links 1 and 2 outwardly in opposite directions and then inwardly, by which construction, the hook 3 on the link 1 will engage the flange on one side of the rim, while the other hook 3 will engage such flange on the other side thereof, at a point spaced diametrically from the first-named hook. This is a rather salient feature of the invention, since the tool is readily held in position upon the rim, and since the strain of contracting the latter is more nearly equalized.

I claim:

1. A tool comprising a pair of links, having hooks at their outer ends, a lever pivoted to the inner end of one of said links and pivotally connected to the inner end of the other link, and additional links carried by the fulcrum of the lever, and having hooks on their outer ends.

2. A tool, comprising a pair of links, having hooks on their outer ends, a bell crank lever pivoted at its angle to the inner end of one link and having one of its arms pivoted to the inner end of the other link, means in conjunction with said lever and one of the aforesaid links for locking the former in adjusted position, additional links carried by the fulcrum of the lever, and additional hooks on the outer ends of said additional links.

3. A tool comprising a pair of links having hooks on their outer ends, a bell crank lever pivoted at its angle to the inner end of one link and having one of its arms pivoted to the inner end of the other link, means in conjunction with said lever and the second named link for locking the former in adjusted position, and additional links pivoted at their inner ends to said lever at its angle and having hooks on their outer ends, one of the last named links extending radially on each side of the first named link, the hook on the first named link facing oppositely from the hooks on the other links, as and for the purpose described.

In testimony whereof I have hereunto set my hand in presence of two subscribing witnesses.

VICTOR McLAIN.

Witnesses:
 Geo. D. Long,
 Gertrude Linder.